(12) United States Patent
Allais

(10) Patent No.: US 9,889,901 B2
(45) Date of Patent: Feb. 13, 2018

(54) SCOOTER

(71) Applicant: Denis Allais, Auckland (NZ)

(72) Inventor: Denis Allais, Auckland (NZ)

(*) Notice: Subject to any disclaimer, the term of this patent is extended or adjusted under 35 U.S.C. 154(b) by 0 days.

(21) Appl. No.: 14/714,662

(22) Filed: May 18, 2015

(65) Prior Publication Data
US 2015/0336626 A1 Nov. 26, 2015

(30) Foreign Application Priority Data

May 20, 2014 (CN) .................... 2014 2 0258886 U

(51) Int. Cl.
| B62K 3/00 | (2006.01) |
|---|---|
| B62K 21/12 | (2006.01) |
| B62M 1/00 | (2010.01) |
| B62J 25/00 | (2006.01) |

(52) U.S. Cl.
CPC ............... B62K 3/002 (2013.01); B62J 25/00 (2013.01); B62K 21/12 (2013.01); B62M 1/00 (2013.01)

(58) Field of Classification Search
CPC .......... B62K 3/002; B62K 21/12; B62M 1/00
USPC ......... 280/63, 87.041, 87.04, 239, 267, 263; 482/146
See application file for complete search history.

(56) References Cited

U.S. PATENT DOCUMENTS

| 1,591,581 A | 7/1926 | Trejo |
|---|---|---|
| 1,664,858 A | 4/1928 | Headley |
| 1,689,916 A | 10/1928 | Fisher |
| 1,844,305 A | 2/1932 | White |
| 3,179,433 A | 4/1965 | Flack |
| 3,620,547 A * | 11/1971 | Vaverek ................. B62K 3/002 280/87.042 |
| 4,203,610 A | 5/1980 | Mihalik |
| 4,204,698 A | 5/1980 | Mihalik |
| 4,669,746 A | 6/1987 | Wu |
| D292,221 S | 10/1987 | Mueller |
| 4,705,286 A | 11/1987 | Lauzier et al. |
| D295,428 S | 4/1988 | Cummings |
| 4,761,014 A | 8/1988 | Huang |
| D300,756 S | 4/1989 | Cummings |
| 4,824,131 A | 4/1989 | Thay |
| D301,157 S | 5/1989 | Hess |
| D305,134 S | 12/1989 | Rubio et al. |
| 5,039,121 A | 8/1991 | Holter |
| 5,072,961 A | 12/1991 | Huppe |
| 5,328,193 A | 7/1994 | Shiew |
| 5,470,089 A | 11/1995 | Whitson et al. |
| D392,001 S | 3/1998 | Chen |

(Continued)

Primary Examiner — Jacob D Knutson
(74) Attorney, Agent, or Firm — Nixon & Vanderhye P.C.

(57) ABSTRACT

A scooter comprises a main frame, a handle bar arranged in front of the main frame and extending upward, a handle mounted at the upper end of the handle bar, and a front wheel and a rear wheel arranged below the main frame, the main frame including a connecting seat in the front thereof used for connecting with the handle bar, and a connecting bar extending backward from the connecting seat, with the connecting bar provided on the left and right sides with a left pedal and a right pedal extending outward, respectively. While pedaling, a pedaler alternatively pedals on the left and right pedals with both feet, which changes the traditional way of pedaling with one foot in the front and the other in the rear, and has better stability and higher pedaling speed.

19 Claims, 3 Drawing Sheets

(56) References Cited

U.S. PATENT DOCUMENTS

| | | |
|---|---|---|
| 5,785,331 A | 7/1998 | Rappaport |
| 5,899,474 A | 5/1999 | Grutzik |
| 5,927,733 A * | 7/1999 | Banda ................... B62K 3/002 188/19 |
| 5,992,864 A | 11/1999 | Dickson et al. |
| 6,135,474 A | 10/2000 | Nakamura |
| 6,149,177 A | 11/2000 | Valdez |
| 6,250,656 B1 | 6/2001 | Ibarra |
| 6,273,439 B1 | 8/2001 | Ray et al. |
| 6,279,929 B1 | 8/2001 | Fruechtenicht |
| 6,378,879 B2 | 4/2002 | Rappaport |
| 6,450,516 B1 | 9/2002 | Nall, III |
| 6,488,295 B1 | 12/2002 | Bryant |
| 6,588,784 B1 | 7/2003 | Chen |
| 6,648,355 B2 | 11/2003 | Ridenhour |
| 6,659,486 B2 | 12/2003 | Eschenbach |
| 6,739,606 B2 | 5/2004 | Rappaport |
| D492,367 S | 6/2004 | Pomroy et al. |
| 6,854,752 B2 | 2/2005 | Chao |
| D503,661 S | 4/2005 | Huntsberger et al. |
| 7,261,310 B2 | 8/2007 | Yifrah et al. |
| 7,458,596 B1 | 12/2008 | Serna |
| 7,487,982 B2 | 2/2009 | Chan |
| 7,543,829 B1 | 6/2009 | Barnes |
| 7,803,090 B2 | 9/2010 | Kraus |
| 7,951,049 B2 | 5/2011 | Mondello et al. |
| 8,322,735 B2 | 12/2012 | Steinbach |
| 2002/0070519 A1 | 6/2002 | Rappaport |
| 2002/0093161 A1 | 7/2002 | Udwin et al. |
| 2002/0121754 A1 | 9/2002 | Nall, III |
| 2003/0001350 A1* | 1/2003 | Eschenbach ............. B62M 1/26 280/63 |
| 2003/0127822 A1 | 7/2003 | Fleck et al. |
| 2003/0132592 A1 | 7/2003 | Dombroski |
| 2003/0193159 A1 | 10/2003 | Ridenhour |
| 2003/0214113 A1 | 11/2003 | Bank |
| 2004/0004341 A1 | 1/2004 | Carr et al. |
| 2004/0012166 A1 | 1/2004 | Reginato |
| 2004/0080130 A1* | 4/2004 | Lewis ................ A63C 17/0046 280/87.041 |
| 2005/0248117 A1 | 11/2005 | Hung |
| 2005/0253357 A1 | 11/2005 | Cheng |
| 2005/0285368 A1 | 12/2005 | Yifrah |
| 2006/0076752 A1 | 4/2006 | Montague et al. |
| 2006/0186641 A1 | 8/2006 | Chan |
| 2007/0001422 A1* | 1/2007 | Kraus ................... A63B 22/00 280/200 |
| 2007/0278763 A1 | 12/2007 | Saville |
| 2009/0212529 A1 | 8/2009 | Stenberg |
| 2010/0253036 A1 | 10/2010 | Liu et al. |
| 2011/0233894 A1* | 9/2011 | Lovley, II ............. B62K 3/002 280/288.4 |
| 2012/0049476 A1* | 3/2012 | Querro .................. B62K 19/18 280/87.041 |
| 2013/0049334 A1* | 2/2013 | Powers ................. B62K 15/00 280/655.1 |

* cited by examiner

SCOOTER

CROSS-REFERENCE TO RELATED APPLICATION

This application claims priority to Chinese Utility Model Application No. 201420258886.5, filed May 20, 2014, the entire contents of which are incorporated herein by reference.

BACKGROUND

The present utility model relates to a scooter.

A scooter, as a common recreational sports tool, not only can be used as a means of transport, but also is fashionable sports equipment. The scooter available on the market comprises a main frame, a wheel arranged below the main frame, a handle bar arranged in front of the main frame and extending upward, and a handle mounted at the upper end of the handle bar. While pedaling the existing scooter, the feet are stepped on the main frame with one in the front and the other in the rear, which neither has good stability nor can achieve higher speed.

SUMMARY

According to one aspect of the present technology, a scooter includes a left pedal and a right pedal formed on both sides of the connecting bar. While pedaling the scooter, the pedaler pedals on the left and right pedals with both feet, which changes the traditional way of pedaling with one foot in the front and the other in the rear, and has better stability and higher pedaling speed.

According to another aspect of the present technology, a scooter comprises a main frame, a handle bar arranged in front of the main frame and extending upward, a handle mounted at the upper end of the handle bar, and a front wheel and a rear wheel arranged below the main frame, the main frame including a connecting seat in the front thereof used for connecting with the handle bar, and a connecting bar extending backward from the connecting seat, with the connecting bar provided on the left and right sides with a left pedal and a right pedal extending outward, respectively.

In examples, a pedal, mounted on the bottom of the connecting bar, may have a lateral width greater than that of the connecting bar, and may be fixed at the central part to the connecting bar, extending outward on both sides beyond the connecting bar to form the left pedal and the right pedal. In order to prevent both feet from sliding forward off the scooter in the process of pedaling, the pedal may be provided with a limit portion extending upward and forward at the front edge of the left pedal and the right pedal.

In example, the front wheel may be mounted below the connecting seat through a front fork, and the rear wheel may be mounted at the rear of the connecting bar through a rear fork, with the rear fork provided with a rear cover over the rear wheel.

The present technology may have one or more of the following advantages:

1. With a left pedal and a right pedal formed on both sides of the connecting bar in the scooter, while pedaling the scooter, the pedaler (alternatively) pedals on the left and right pedals with both feet, which changes the traditional way of pedaling with one foot in the front and the other in the rear, and has better stability and higher pedaling speed.

The rear fork may be provided with a rear cover over the rear wheel, which prevents the pedaler from touching the rear wheel mistakenly, and thus improves the safety performance while pedaling.

DETAILED DESCRIPTION

Figure 1:
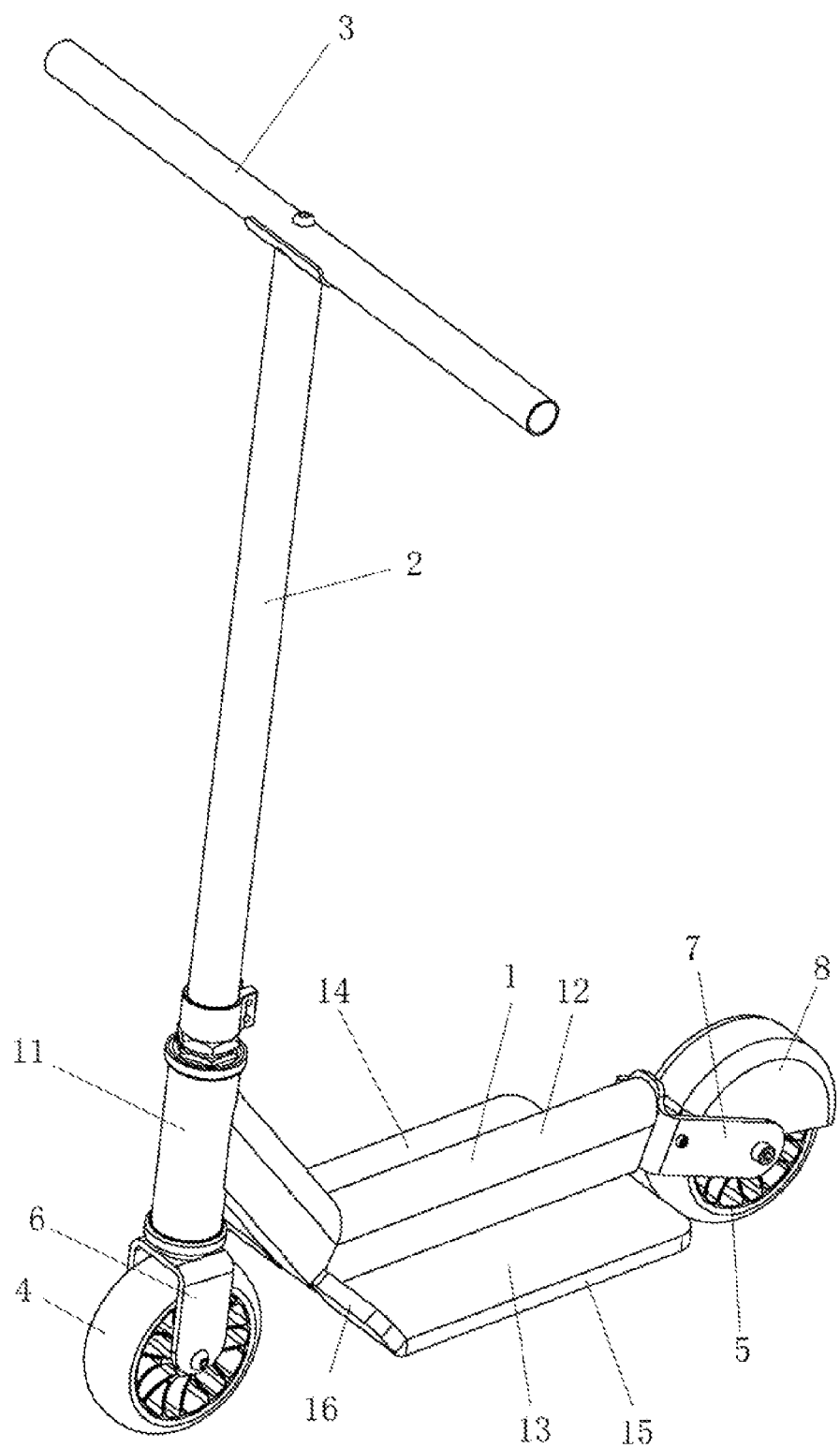
FIG. 1 is a schematic view of the structure of the present utility model.
Figure 2:
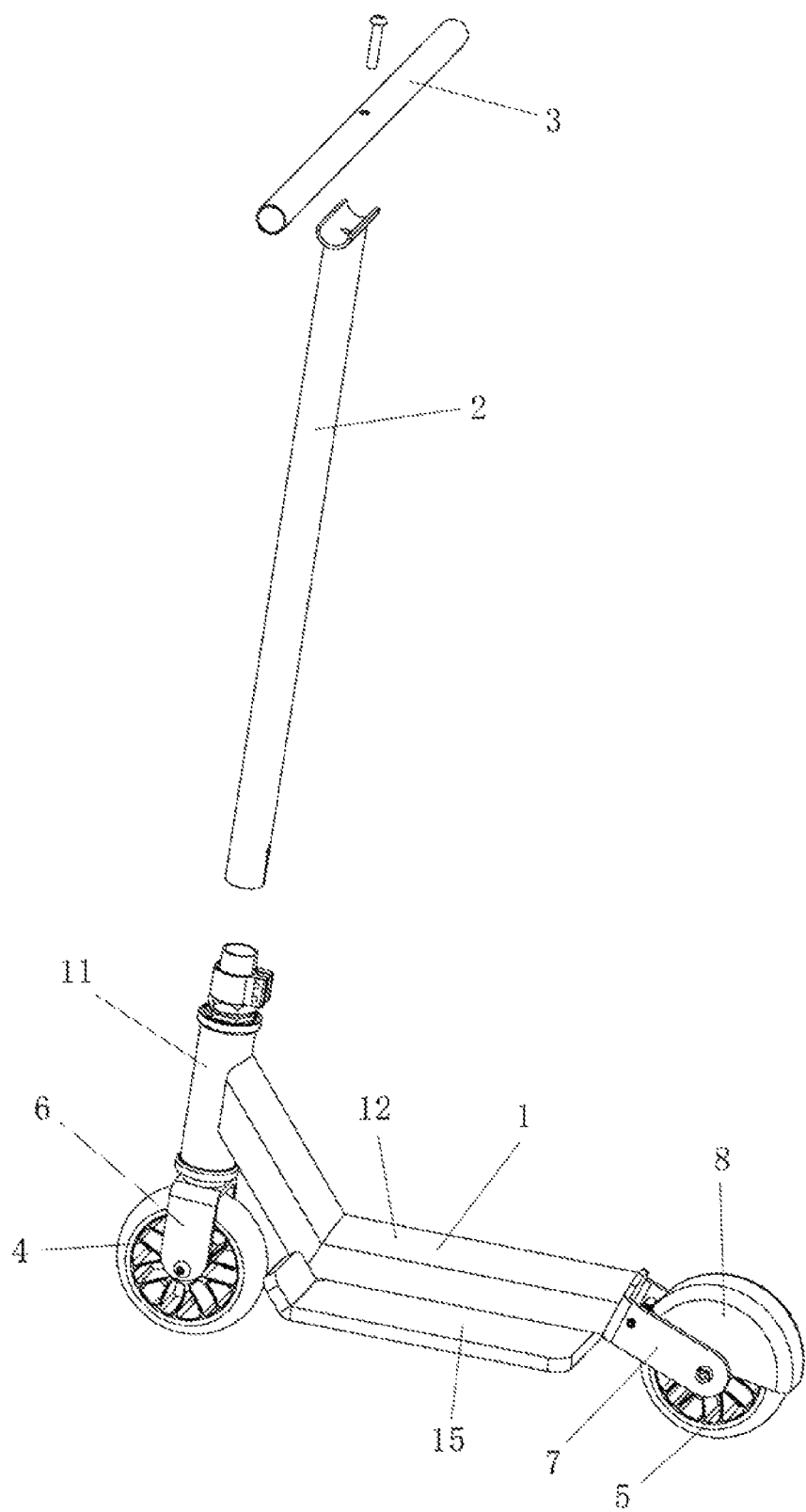
FIG. 2 is a partially exploded view of the present utility model.
Figure 3:
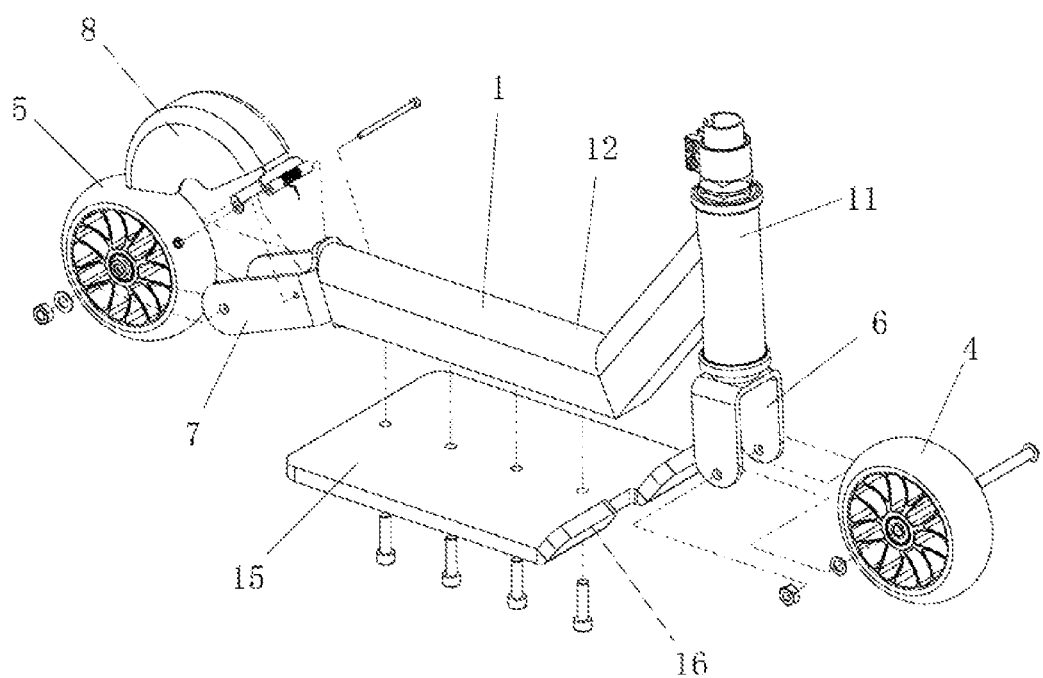
FIG. 3 is a schematic view of the mounting structure of the main frame, the front wheel, the rear wheel and the pedal in the present utility model.

As shown in FIGS. 1-3, a scooter is provided, comprising a main frame 1, a rotatable handle bar 2 arranged in front of the main frame 1 and extending upward, a handle 3 mounted at the upper end of the handle bar 2, and a front wheel 4 and a rear wheel 5 arranged below the main frame 1, with the main frame 1 including a connecting seat 11 in the front thereof used for connecting with the handle bar 2, and a connecting bar 12 extending backward from the connecting seat 11. The front wheel 4 is mounted below the connecting seat 11 through a front fork 6, and the rear wheel 5 is mounted at the rear of the connecting bar 12 through a rear fork 7, with the rear fork 7 provided with a rear cover 8 over the rear wheel 5. A pedal 15, mounted on the bottom of the connecting bar 12, has a lateral width greater than that of the connecting bar 12, and is fixed at the central part to the connecting bar 12, extending outward on both sides beyond the connecting bar 12 to form the left pedal 13 and the right pedal 14.

In order to prevent both feet from sliding forward off the scooter in the process of pedaling, the pedal 15 is provided with a limit portion 16 extending upward and forward at the front edge of the left pedal 13 and the right pedal 14.

With a left pedal 13 and a right pedal 14 formed on both sides of the connecting bar 12, while pedaling the scooter, the pedaler pedals on the left pedal 13 and the right pedal 14 with both feet, which changes the traditional way of pedaling with one foot in the front and the other in the rear, and has better stability and higher pedaling speed. Providing the rear cover 8 prevents the pedaler from touching the rear wheel mistakenly, and thus improves the safety performance while pedaling.

What is mentioned above is only an example of the present technology. The present technology can also have other examples in addition to the above one. Any technical solution based on equal substitution or equivalent alteration all falls within the scope of protection of the present technology.

While the present technology has been described in connection with several practical examples, it is to be understood that the technology is not to be limited to the disclosed examples, but on the contrary, is intended to cover various modifications and equivalent arrangements included within the spirit and scope of the technology.

The invention claimed is:

1. A scooter, comprising:
    a main frame,
    a handle bar arranged in front of the main frame and extending upward,
    a handle mounted at an upper end of the handle bar, and a front wheel and a rear wheel arranged below the main frame, wherein:

the main frame includes a front with a connecting seat to connect with the handle bar, and a connecting bar extending backward from the connecting seat, a pedal is mounted below the connecting bar, the pedal extending outward on both sides beyond the connecting bar to form a left pedal and a right pedal, the connecting bar is substantially flush with the pedal along substantially an entire length of the pedal, a plurality of securing devices extend upwardly through a first plurality of holes provided along a bottom portion of the pedal and through a second plurality of holes in a bottom of a horizontal extent of the connecting bar to secure the pedal to the connecting bar, wherein upper ends of the securing devices terminate inside the connecting bar and are positioned between the left pedal and the right pedal, and wherein the plurality of securing devices includes at least a first securing device, a second securing device and a third securing device, the first securing device being positioned adjacent a rear part of the pedal, the second securing device being positioned adjacent a front part of the pedal, and the third securing device is positioned between the first and second securing devices and located between the left pedal and the right pedal.

2. The scooter according to claim 1, wherein: the pedal is provided with a limit portion extending upward and forward at a front edge of the left pedal and the right pedal.

3. The scooter according to claim 2, wherein: the front wheel is mounted below the connecting seat through a front fork, and the rear wheel is mounted at a rear of the connecting bar through a rear fork.

4. The scooter according to claim 3, wherein: the rear fork is provided with a rear cover over the rear wheel.

5. The scooter according to claim 1, wherein: the front wheel is mounted below the connecting seat through a rotatable front fork, and the rear wheel is mounted at a rear of the connecting bar through a rear fork.

6. The scooter according to claim 5, wherein: the rear fork is provided with a rear cover over the rear wheel.

7. The scooter according to claim 1, wherein: the front wheel is mounted below the connecting seat through a front fork, and the rear wheel is mounted at a rear of the connecting bar through a rear fork.

8. The scooter according to claim 7, wherein: the rear fork is provided with a rear cover over the rear wheel.

9. The scooter according to claim 1, wherein the connecting bar includes a horizontal section that terminates proximate a front end of the pedal, and an upwardly and forwardly angled section that connects to the connecting seat.

10. The scooter according to claim 1, wherein the pedal includes a limit stop extending at a first angle relative to the left pedal and the right pedal, and the connecting bar includes a horizontal rear section and a front section angled at a second angle relative to the horizontal rear section, the first and second angles being substantially equal.

11. The scooter according to claim 1, wherein the pedal includes an open ended notch to receive the connecting bar.

12. The scooter according to claim 11, wherein the notch receives a transitional part of the connecting bar where a horizontal portion of the connecting bar transitions to an upwardly angled part of the connecting bar.

13. The scooter according to claim 12, wherein the pedal includes a limit stop on each side of the notch.

14. The scooter according to claim 13, wherein a first angle of the upwardly angled part substantially matches a second angle of each limit stop, wherein the first and second angles have vertices that are proximate one another.

15. The scooter according to claim 1, wherein a terminal rear end of the connecting bar is positioned lower than an upper end of the rear wheel.

16. The scooter according to claim 1, wherein the connecting bar has a substantially flat bottom fixedly connected to the pedal, and substantially flat left and right side portions extending upwardly from the bottom.

17. The scooter according to claim 1, further comprising a fourth securing device positioned between the first and third securing devices and located between the left and right pedals.

18. A scooter comprising:

a main frame with a connecting seat and a connecting bar;

a handle bar rotatably coupled to the connecting seat;

a steerable front wheel associated with the handle bar;

a rear wheel extending to a rear of the connecting bar;

a handle connected to the handle bar; and a pedal flushly mounted below the connecting bar via a plurality of securing devices extending upwardly through a first set of holes provided in a bottom wall of the pedal and through a second set of holes in a bottom of the connecting bar, wherein upper ends of the securing devices terminate inside the connecting bar without passing through a top of the connecting bar, the pedal extending outwardly from the connecting bar to form a right pedal and a left pedal, the plurality of securing devices including at least a first securing device and a second securing device, the first securing device being positioned adjacent a rear part of the pedal and the second securing device being positioned adjacent a front part of the pedal, the first and second securing device being located between the left and right pedals.

19. The scooter according to claim 18, wherein:

a rear terminal end of the pedal is horizontal and terminates proximate a rear horizontal end of the connecting bar, and the pedal includes a limit stop angled so as to match an angled part of the connecting bar that connects to the connecting seat.

\* \* \* \* \*